United States Patent [19]

Jonsson

[11] Patent Number: 5,728,186
[45] Date of Patent: Mar. 17, 1998

[54] WASTE GAS TREATMENT APPARATUS

[76] Inventor: Kjartan A. Jonsson, Sage Rd., Ballston Lake, N.Y. 12019

[21] Appl. No.: 728,702

[22] Filed: Oct. 11, 1996

Related U.S. Application Data

[60] Provisional application No. 60/005,445, Oct. 12, 1995.
[51] Int. Cl.$^6$ .............................. B01D 45/14; B01D 47/16
[52] U.S. Cl. .................................. 55/230; 55/240; 55/241; 55/402; 95/218; 95/235
[58] Field of Search ....................... 95/218, 216, 270, 95/151, 149, 235; 55/230, 231, 232, 240, 241, 400, 401, 402, 406, 407

[56] References Cited

U.S. PATENT DOCUMENTS

| | | | |
|---|---|---|---|
| 596,996 | 1/1898 | Griffiths | 261/117 |
| 689,246 | 1/1901 | Theisen | 55/231 |
| 1,510,353 | 9/1924 | Turner | 95/151 |
| 1,898,807 | 2/1933 | Barnes | 95/218 |
| 2,583,252 | 1/1952 | Carraway | 55/228 |
| 2,698,745 | 1/1955 | Boucher | 55/230 |
| 3,292,347 | 12/1966 | Hodgkinson | 55/400 |
| 3,395,513 | 8/1968 | Von Unwerth | 95/151 |
| 3,487,607 | 1/1970 | Cox | 55/222 |
| 4,289,506 | 9/1981 | Stone | 95/218 |
| 5,076,818 | 12/1991 | Jonsson | 95/218 |
| 5,217,508 | 6/1993 | Jonsson | 55/89 |

*Primary Examiner*—Duane S. Smith
*Attorney, Agent, or Firm*—Schmeiser, Olsen & Watts

[57] ABSTRACT

Fluid gases are stripped clean of gaseous and particulate pollutants as they pass rapidly up the stack of an industrial or electric power generation plant by a battery of rapidly rotated air foil spokes arrayed in two sets interleaved and revolving around a common central axis, a single motor providing the power that maintains the cleaning operation as long as flue gas flows toward discharge to the atmosphere.

9 Claims, 15 Drawing Sheets

WASTE GAS TREATMENT APPARATUS

FIELD OF THE INVENTION

The present inventions relate generally to the art of cleaning flowing gases, and are more particularly concerned with a novel method for separating and removing particulate material, moisture and oxides of nitrogen and sulfur from fossil fuel combustion gases and industrial effluent gases in general, and with a novel apparatus implementing that method.

RELATED PATENTED INVENTIONS

These inventions are related to that of my U.S. Pat. No. 5,076,818 issued Dec. 31, 1991 and entitled "Gas Cleaning Methods and Apparatus" in which a novel rotating wheel array is disclosed and claimed along with a new gas purification method involving the use of that unique apparatus. The entire disclosure of that '818 patent is incorporated herein by reference.

RELATED PROVISIONAL PATENT APPLICATION

This patent application filed under 35 U.S.C. 119(e) has the benefit of U.S. Provisional Application Ser. No. 60/005,445, filed Oct. 12, 1995, the original text of which is included herein, now abandoned.

BACKGROUND OF THE INVENTION

The apparatus of that '818 patent of mine stands as a proven success, being superior to prior art devices in widespread used herefore for the same purpose. Thus it remains most effective and efficient means for the gas cleaning in use today.

SUMMARY OF THE INVENTION

By virtue of the present invention, based on the new concepts set forth below, substantial improvement in the efficiency and in the operation of my patented method and apparatus can be gained. Moreover these results are obtainable without offsetting capital cost penalty or loss of gas treating capacity.

According to one of my new concepts, the multiple wheels of the apparatus of my '818 patent are eliminated, being replaced in function by an inner drum and single drive wheel combination and a single drive wheel for the outer drum. The drums being spaced apart radially, provide an open-ended cylindrical chamber passageway in which flowing gas is cleansed by water spray entering the passageway through numerous small openings in the inner drum. As a novel alternative one set of wheels, like those of the '818 patent carried by a central drive shaft, are fitted at their periphery with spoke pairs and a cylindrical shield which with the outer drum provides the waste gas passageway through the gas cleaning section of the apparatus.

A related new concept of mine is to maximize the gas cleansing effect in the drum chamber by providing two sets of spokes, each of which is secured at one end to one drum or the other and extends radially with the spoke free end in proximity to the opposed drum. The spokes are interleaved for magnified effect, those of the outer drum being axially closely spaced to those of the inner drum throughout the axial length of the drum pair.

Still another concept to mine is to mount the spokes in pairs with the free ends of each pair joined and one member of each pair is disposed at an angle of 1.4 degree above the drum radius and the other is disposed at an angle about 1.4 degree below the drum radius so that the total angle between the pair is about 2.8 degrees. This relationship I have found to be critical to maximum cleaning effect. It is also a novel feature of importance that of each spoke presents a leading edge surface sloping at about 18°, the included angle then being about 36°, again for increased efficiency of the power output, greater atomization of cleaning water and enhanced cleaning effect according to my experimental findings.

Drives for the spokes of the present invention apparatus are electric motor-gear combinations and drive wheels connecting the motor drive shafts to the spokes carried by inner and outer drums or to the spokes of the wheels in the case of this invention apparatus which does not include an inner drum. In both the rotating drum pairs-type machine and the drum and wheel-type machine the motors are protected against contact by flue gasses delivered into the machine. Enclosures for the motors are provided by motor receiving chambers formed in the lower plenum and the upper plenum of the apparatus. This feature is of special benefit when the apparatus is to be used in cleaning gasses containing substantial fractions of corrosive constituents.

As the accompanying drawings indicate, gas cleaning apparatus is operated in upright position, that is, with its axis vertical and rigidly so maintained by a fixed supporting structure in which the apparatus is removably mounted.

Another novel feature of this invention apparatus is the use of a single motor, as indicated above, for the purpose of driving the outer drum and the inner drum in opposite directions as is necessary for maximum gas cleaning effect in the drum cleaning chamber. This apparatus, in addition to the single motor of capacity capable of handling the desired power output, incorporates a gear assembly which includes an inner drive shaft and a coaxial concentric outer drive shaft and with separate gears driven by the drive shaft of the motor, one of which serves the inner drive shaft gear box output and the other of which serves the reverse direction rotation of the inner drum. These two shafts of output of opposite direction of rotation are secured to the outer and inner drums and provide the total driving force delivery to the respective drums throughout the period of operation of the machine. A substantial advantage is gained in terms of horsepower usage by scaling up the size of these machines and by using a single large motor to replace two smaller ones. In actual test, a saving of between 40% and 50% is thus accomplished without any loss of quality of clean air delivered at the exhaust port of the equipment or any other significant offsetting disadvantage.

Another important related concept of this invention which is embodied in the present apparatus is, as indicated above, the scaling up of the apparatus capacity while not correspondingly increasing the mass of the equipment, the material or labor costs or the operating power requirement. Thus these would normally be substantially directly proportional the scale up, but according to this invention gear systems are used uniquely and effectively in the design and construction of the invention apparatus. As an additional advantage this combination of motor and gear system enables spoke tip speed adjustment to the most favorable balance of cleaning effectiveness and energy input. On the basis of experience with this equipment, I have determined the optimum tip speed conditions proven by data generated under operating conditions.

Additional new features of this apparatus and the new results and advantages they afford will become apparent on consideration of the detailed description following.

BRIEF DESCRIPTION OF THE DRAWINGS

The drawings accompanying and forming part of this disclosure illustrate the foregoing novel features described in detail below.

DETAILED DESCRIPTION OF THE INVENTIONS

Figure 1:
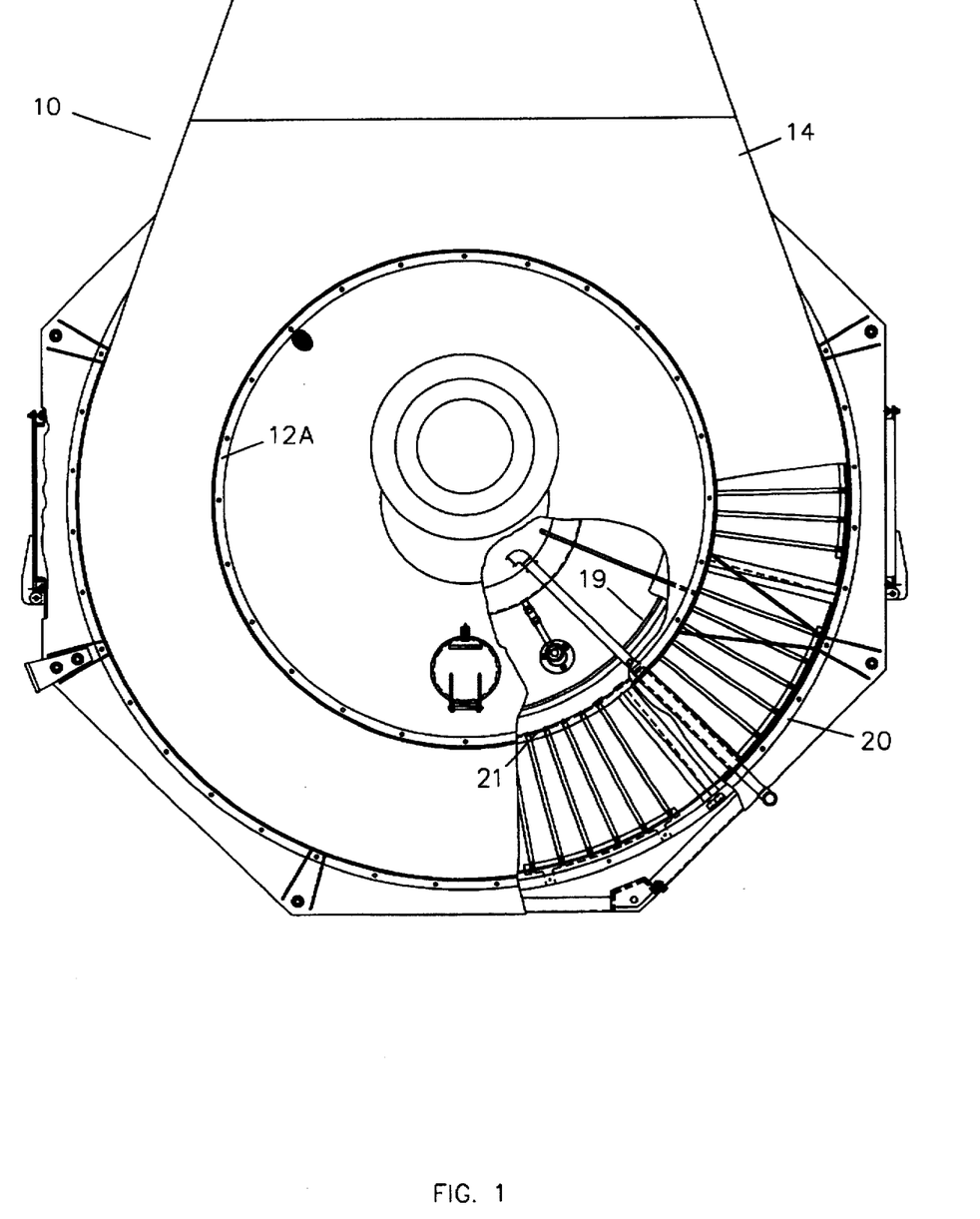
FIG. 1 is a top plan view of the apparatus of this invention partly in section with parts broken away for clarity.
Figure 2:
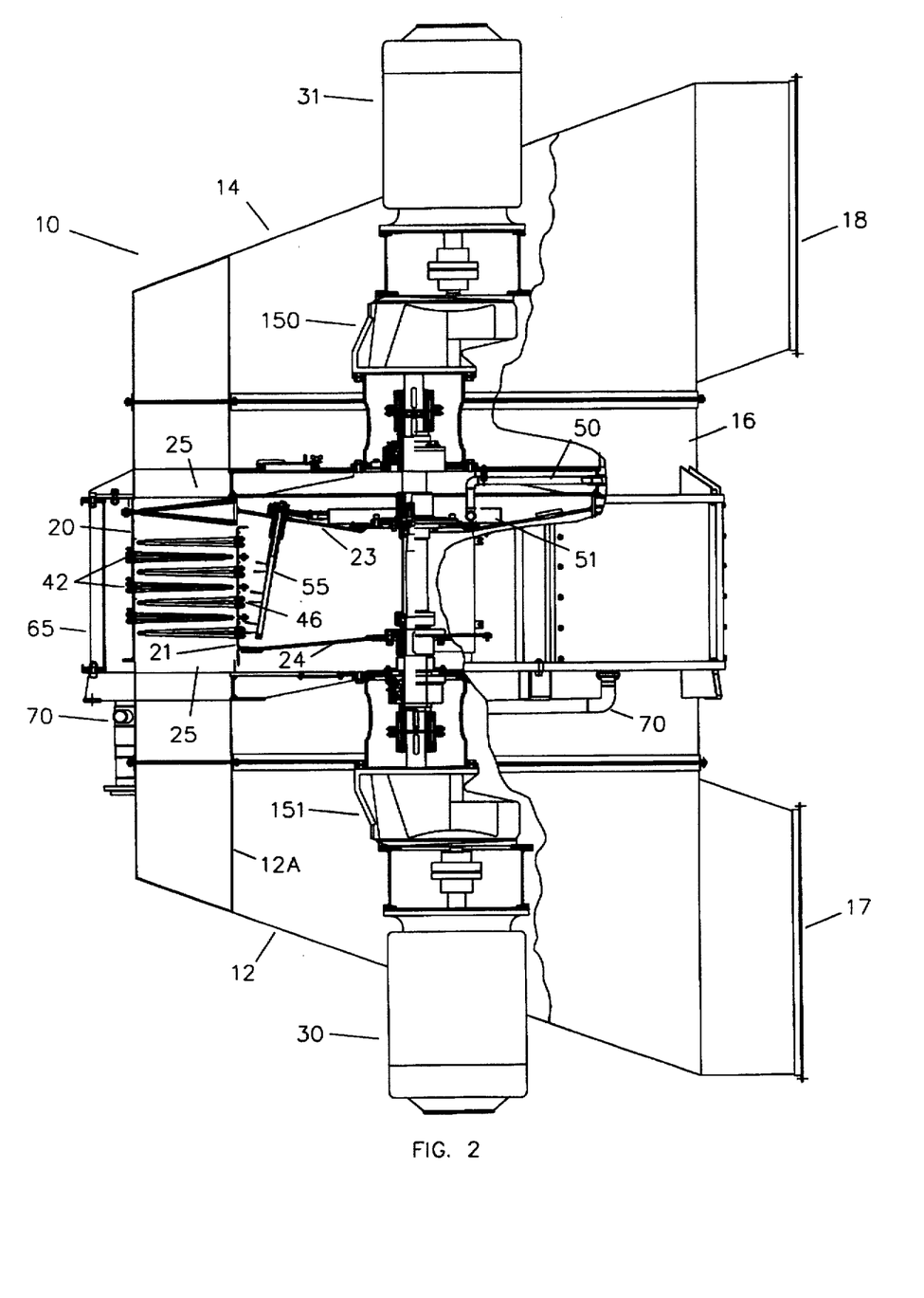
FIG. 2 is a side elevational view of the apparatus of FIG. 1 in partial section taken on line A—A of FIG. 1.

As shown in FIGS. 1 and 2, an apparatus or machine 10 embodying the present novel features comprises a generally cylindrical structure which in upright position has the flue gas intake plenum 12 at its lower end, a cleaned gas exhaust plenum 14 at its upper end and a central cylindrical gas cleaning section 16 for gas flow and travel upwardly through machine 10.

Plenum 12 has an open end portion 17 communicating with a flue (not shown) and an interior which except for a motor receiving enclosure 12A is open on one side for free gas flow into central section 16. Plenum 14 is of the same design and construction and thus is interchangeable with plenum 12 in the assembly. Gas flowing upwardly in the machine then is received in plenum 14 from the central section 16 and is discharged to the atmosphere as cleaned gas through the open end 18 of plenum 14. Also as in plenum 14, a motor receiving enclosure 19 is provided in the plenum to prevent exposure of the motor to clean gasses in the plenum.

Central section 16 comprises an outer drum 20 and an inner drum 21 concentrically carried, respectively, by drive wheels 23 and 24. Being radially spaced apart, drums 20 and 21 provide an open-ended cylindrical chamber 25 which serves as the passageway for gasses traveling through machine 10. It also serves as a gas cleaning chamber as the gas is traveled through an array of spokes carried by drums 20 and 21 as they are driven in opposite directions on the machine axis by motors 30 and 31, through gear boxes 150 and 151 respectively.

Figure 7:
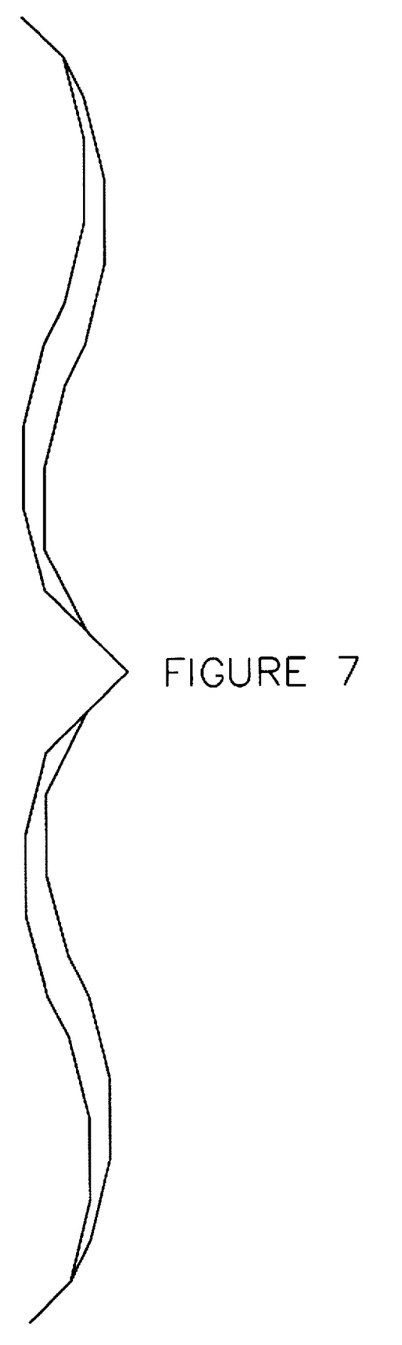
FIGS. 7A–7J are a set of cross sectional views of spokes of air purification wheels of this invention.
Figure 8:
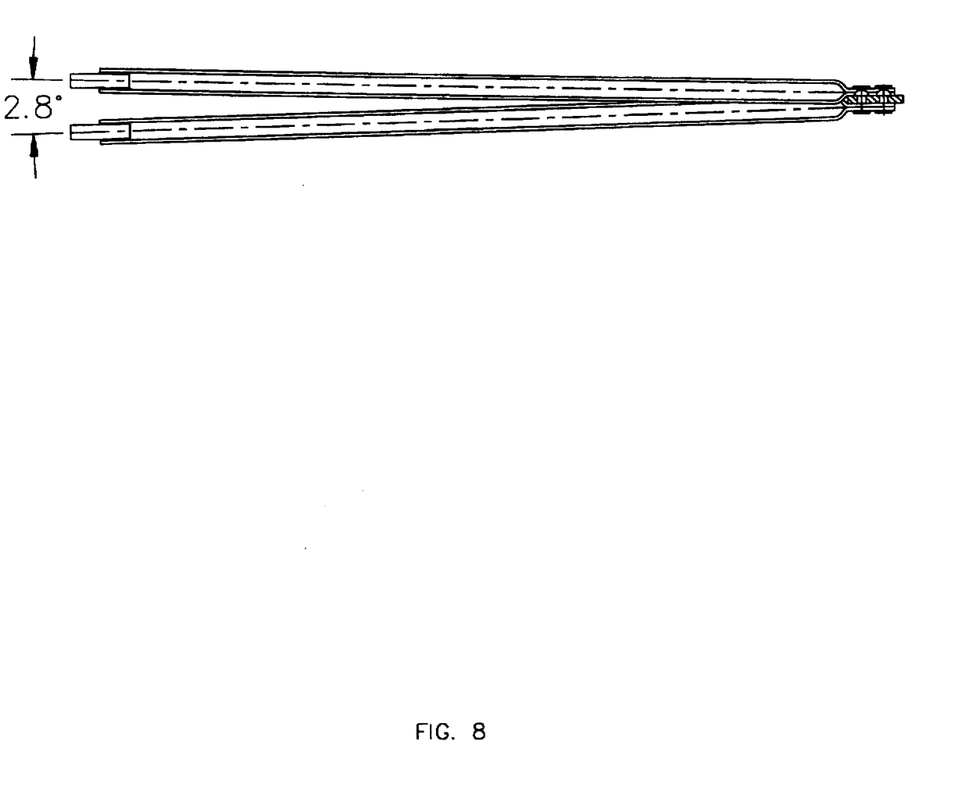
FIG. 8 is a longitudinal sectional view of an assembly of a pair of spokes showing the angular relationship of importance to the desired gas cleaning affect.

The spoke array, as previously indicated, comprises a spoke set 42 attached to outer drum 20 and a spoke set 46 attached to inner drum 21. Each spoke of each set is secured at one end to its drum, the other end being free and disposed in proximity to the opposed drum. Each pair of spokes are attached together at their free ends in the angular relationship described above providing an included angle 2.8 degrees. The spokes individually take forms of a wide variety of designs as shown in FIG. 7. My present preference is the leading edge of the spoke in each instances of V-form shown in FIGS. 7A or 7B of relatively wide included angle to gain the special and important advantages stated above in regard to efficiency of power usage and gas cleaning performance. For maximum gas cleaning action, the leading face of the v-form spoke will be at an angle resulting in maximum droplet impact force and consequent maximum atomization a gas-spray liquid contact. In the present invention apparatus illustrated herein, that angle approximates 45°.

The water delivery system of this apparatus of FIGS. 1 and 2 includes a delivery line 50 and a dish 51 into which line 50 delivers water, dish 51 being attached to the drive shaft of motor 31 which drives the driving wheel of the inner drum so that the dish rotates therewith forcing water in the dish centrifugally into a water delivery wand 55 or preferably a pair of them. Each wand 55 as shown in FIG. 2 is mounted in substantially vertical position but at an angle of about 20 degrees to the vertical axis of the apparatus with its closed lower end closer to inner drum 21 than is the upper end thereof. Water is delivered into the interior chamber of the inner drum through openings in the wand along its axial length, striking the small openings in the inner drum through which the water then contacts the spokes in the cleaning chamber and the gas flowing in contact therewith, facilitating the cleansing action on the gas traveling through the cleaning chamber. A special feature of the wand is that it is provided with an opening array arranged to deliver water sprays uniformly throughout the length of the wand delivery line. In the preferred case, four openings are provided around the lower end portions of the wand and only a pair of openings are provided in the upper end and in the intermediate levels. This arrangement serves very well to initiate the gas cleaning action in the lower section of cleaning chamber 25 and to maintain and carry that same level of cleansing efficiency through the central and upper parts of chamber 25.

A cylindrical shroud 65 surrounding central section 20 of the apparatus serves to gather water emerging from the cleaning chamber as the spokes are spun rapidly around the machine axis during the cleaning operation. The water with its dirt burden and absorbed contaminant gasses is drained continually from the space between shroud 65 and outer drum 20 through the drain line 70.

Figure 3:
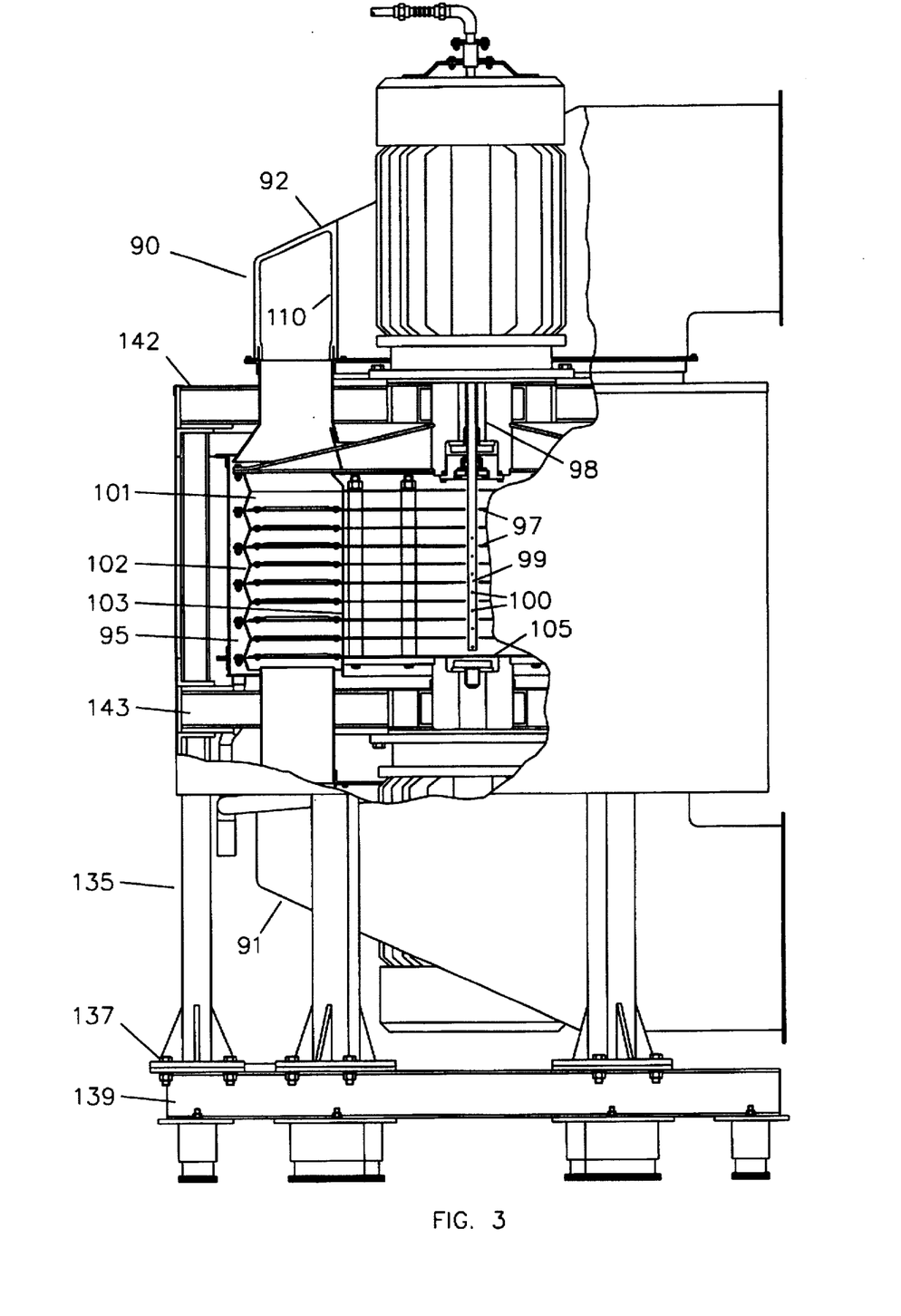
FIG. 3 is a side elevational view of another apparatus embodying this invention with parts broken away and exposed portions of the machine shown in section.
Figure 6:
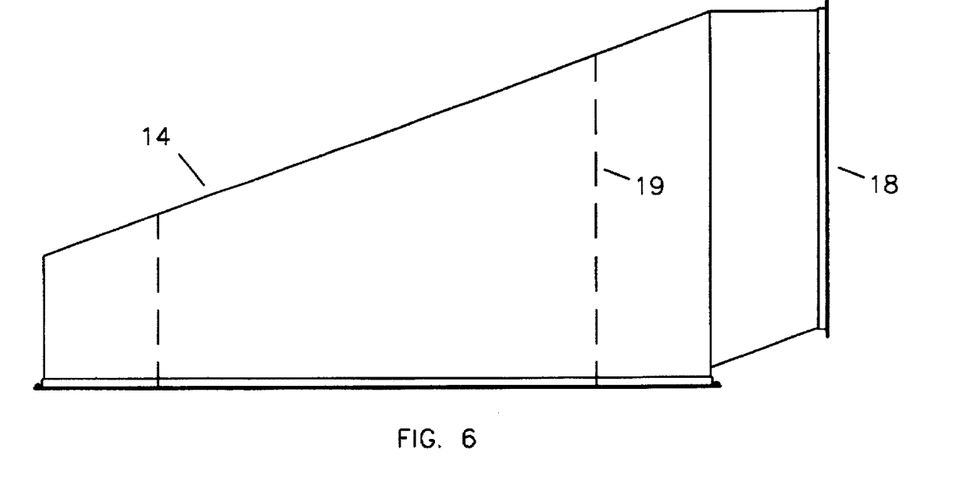
FIG. 6 is a side elevational view of the plenum of FIG. 5.

Apparatus or machine 90 shown in FIG. 3 bears a basic resemblance to apparatus in FIGS. 1 and 2, being likewise of general cylindrical structure and having lower and upper plenums 91 and 92 to receive flue gas and to discharge clean gas to the atmosphere, and a central section 95 in which the cleaning action is carried out. Plenums 91 and 92 are essentially the same as those described above in structure and function but the machine differs substantially in that there are five wheels 97 which carry more than half the total sets of spokes instead of a single drive wheel and drum 21 of machine 10 performing that function, as described above. Additionally, a water delivery system in the FIG. 6 apparatus does not include a centrifugal delivery dish and wand combination, but rather has a motor drive shaft 98 with an inner pipe 99 which extends the full length of the drive shaft and therefrom into the central section of the machine where water is delivered from the pipe through openings 100 along its length so water then is carried both as a spray and as a film in contact with the spokes in the cleaning chamber. Cleaning chamber 101 itself comprises an outer drum 102 like that of FIGS. 1 and 2, a radially-spaced opposed inner shield 103 carried by the wheels 104 and 105 to define with the drum the open-ended generally cylindrical chamber in which the cleaning action is carried out by the contact of the flowing gas with rotating spoke assemblies and water spray and water films on the spokes.

Also as in the apparatus of FIGS. 1 and 2 plenums 91 and 92 are constructed to provide electric motor receiving enclosures 110 to keep the motors from contact by gasses flowing through the apparatus.

The spokes of the apparatus of FIG. 7 are preferably the same as those described above in reference to FIGS. 1 and 2 apparatus and they are assembled and mounted in respect to each other in sets interleaved through the height of the central section as also described above in reference to FIGS. 1 and 2.

In FIG. 7, spokes a variety of shapes are contemplated for use in this apparatus for various purposes and important advantages in terms of cleaning efficiency, cost of production and maintenance. As stated above, the FIG. 7A V-form and 7B triangular form are my preference at this time in the equipment both of the FIGS. 1 and 2 and the FIG. 3 type. In FIGS. 7C, D, E, F, G, H, I and J other alternatives for this use are illustrated. The round of FIG. 7C is readily produced and maintained in service and therefore holds a cost advantage of significance over some of the other spoke forms. The hollow tube of FIG. 7I shares those advantages basically with the FIG. 7C spoke design, while the square cross section and the flat cross section of FIGS. 7E and F may afford the advantages mainly of cohesion and low cost of production. The H and J forms of hexagon and diamond cross section, respectively, may be preferable in some cases, particularly where the ruggedness in use may be a concern. The U-form of FIG. G and the half-round form of FIG. I could also find use in special applications.

Referring further to the apparatus in FIG. 3, the gas travel through the central section of the machine is quite similar to that of the apparatus of FIGS. 1 and 2, the interior chamber of the section within the shield and carried with the wheels is not in the gas stream and minimal amounts of gas entering the inner chamber is not a problem because of the rapid gas flow in substantial volume through the cleaning chamber of the machine.

Figure 4:
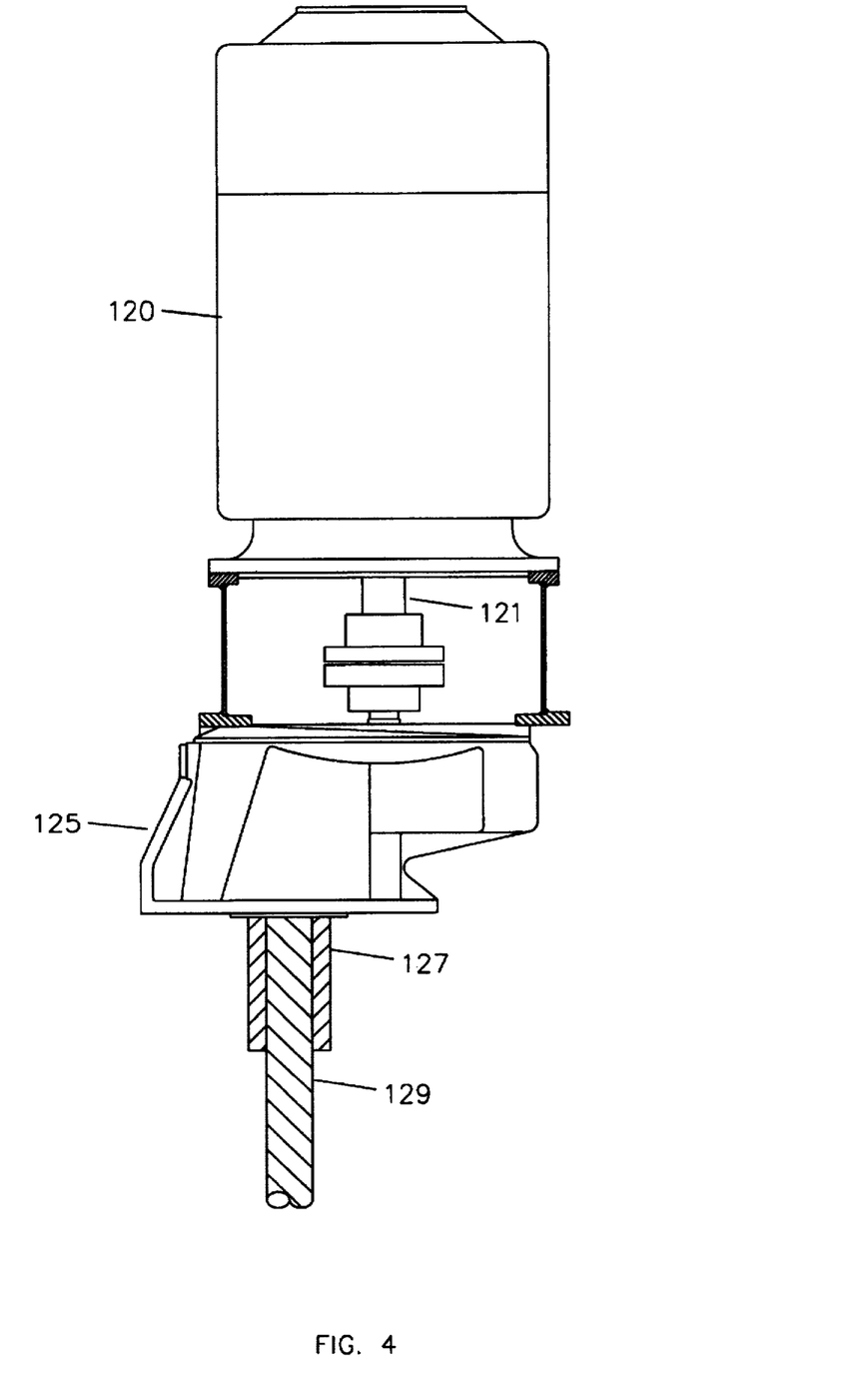
FIG. 4 is a diagrammatic view of the novel motor gear box counter drive of the single motor gas cleaning apparatus of this invention.
Figure 5:
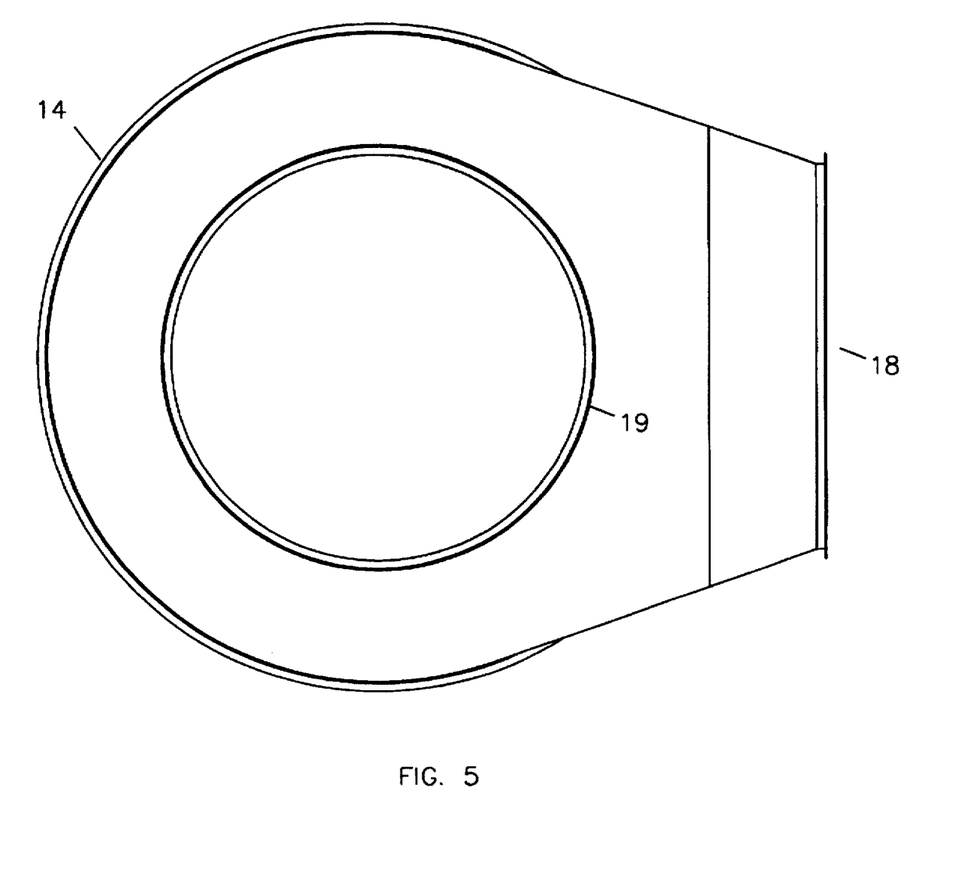
FIG. 5 is a plan view of one of the two plenums of the FIG. 1 apparatus.

As further indicated above, the single motor counter rotation drive system of FIG. 4 is a special future of the larger apparatus type of FIGS. 1 and 2. As shown, motor 120 of high power output is coupled to gear box 125 so that drive shaft 121 of motor 120 engages gears of two sets to drive simultaneously an outer shaft 127 in one direction and an inner shaft 129, in the opposite direction relative to axis of the cleaning machine of FIGS. 1 and 2 or that of FIG. 3 as required for the superior gas cleaning effect capability of those novel machines.

Figure 9:
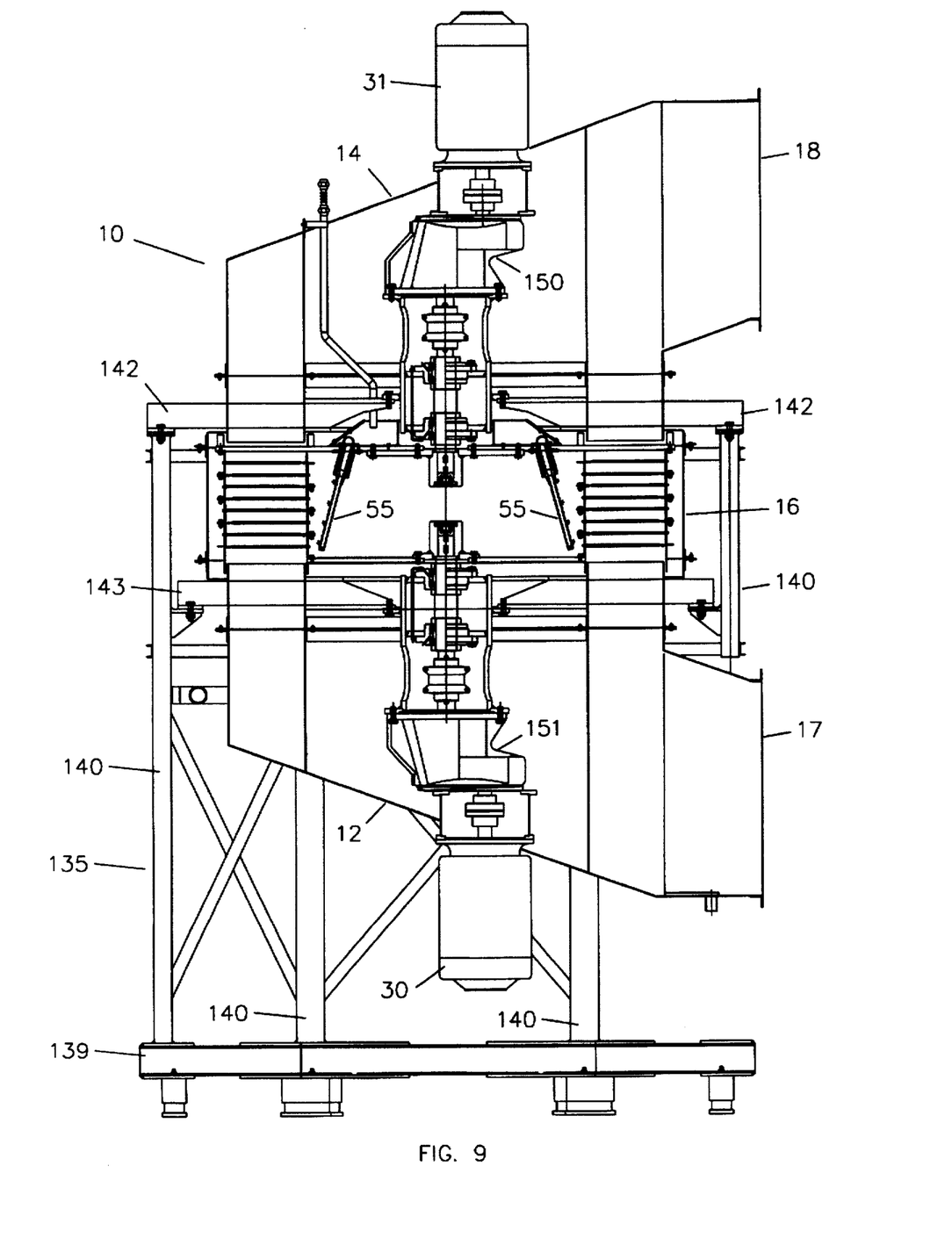
FIG. 9 is a view like that of FIG. 2 of another apparatus of this invention similar to that of FIG. 1.
Figure 10:
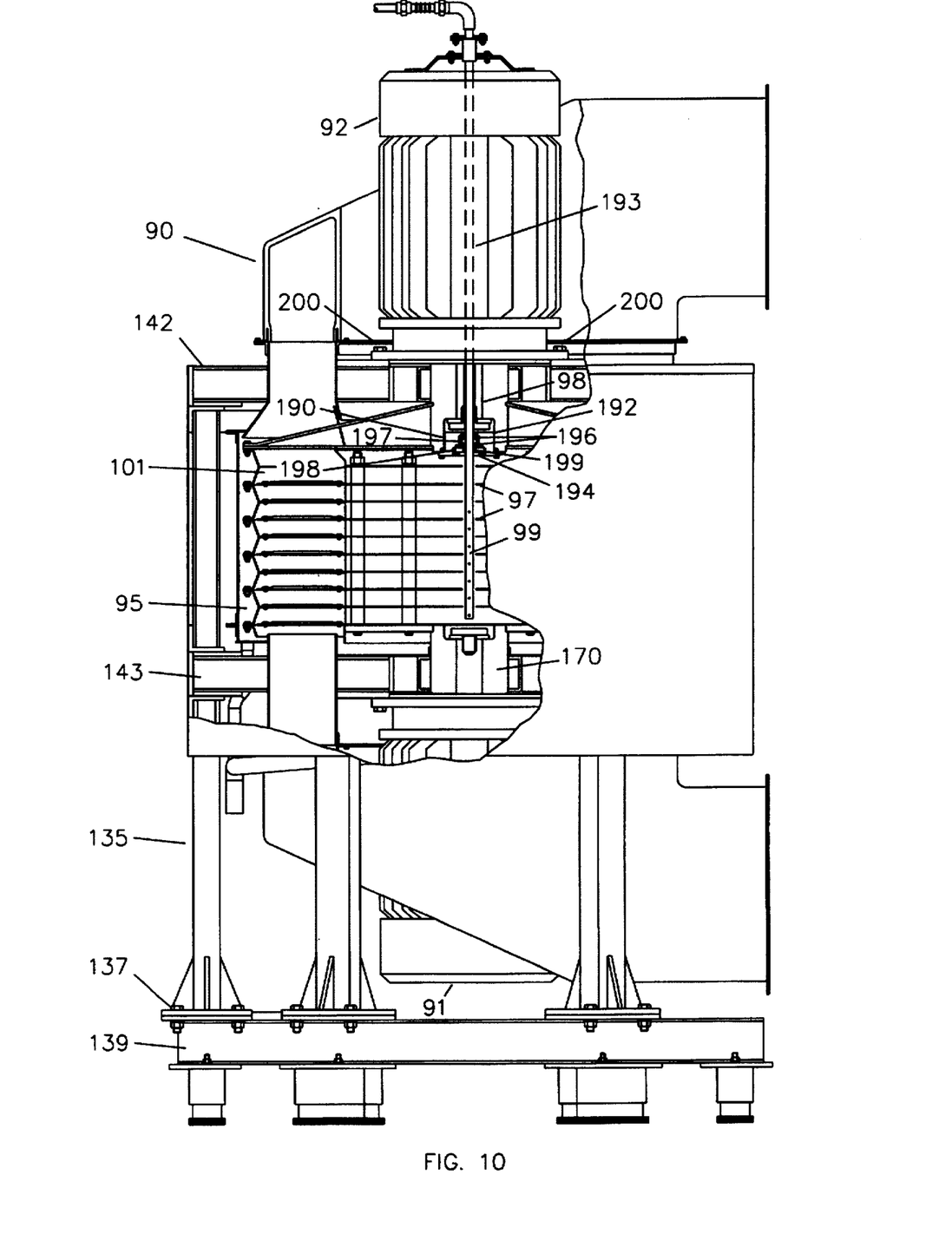
FIG. 10 is a side elevational view of apparatus similar to that of FIG. 3.

In operating position, as shown in FIGS. 3, 9 and 10, the present invention apparatus is displayed upright with its major axis substantially vertical and is secured in fixed position within supporting structure 135. While the apparatus is thus rigidly retained against vibration, it is readily removable from structure 135 simply by loosening or removing connecting bolts 137 joining base member 139 to the lower end of columns 140 and similarity disconnecting the midsection beams 143 from the lower motor. Alternatively and preferably, apparatus removal will leave base and columns 140 attached (suitably welded as shown in FIG. 9), the apparatus being taken out through the top of the supporting structure by removing beams 142 on which the apparatus rests and to which top motor is removably secured, as shown in FIG. 10. Actually, in the case of the FIG. 9 assembly the upper and lower motors are not bolted to beams 142 and 143 but are secured to them through upper and lower gear boxes 150 and 151, the housings of which are bolted to beams 142 and 143, respectively.

With regard to FIGS. 9 and 10 showing updated models of FIGS. 2 and 3 apparatus, respectively, component parts of the same or closely similar structure and function are designated by the same reference character in each instance.

The apparatus of FIG. 9 differs from that of FIG. 3 in three important respects. First, unlike the apparatus of FIG. 3, the upper and lower rotors are independently supported. Secondly, the more and gear assemblies are the same and therefore interchangeable in the FIG. 9 case. Finally, and most importantly, the gas containment structure is not self supporting. Instead, a separate supporting structure holds and carries the entire gas cleaning apparatus and not being exposed to hot, corrosive waste gasses, it can be made of relatively in expansive alloys.

Figure 11:
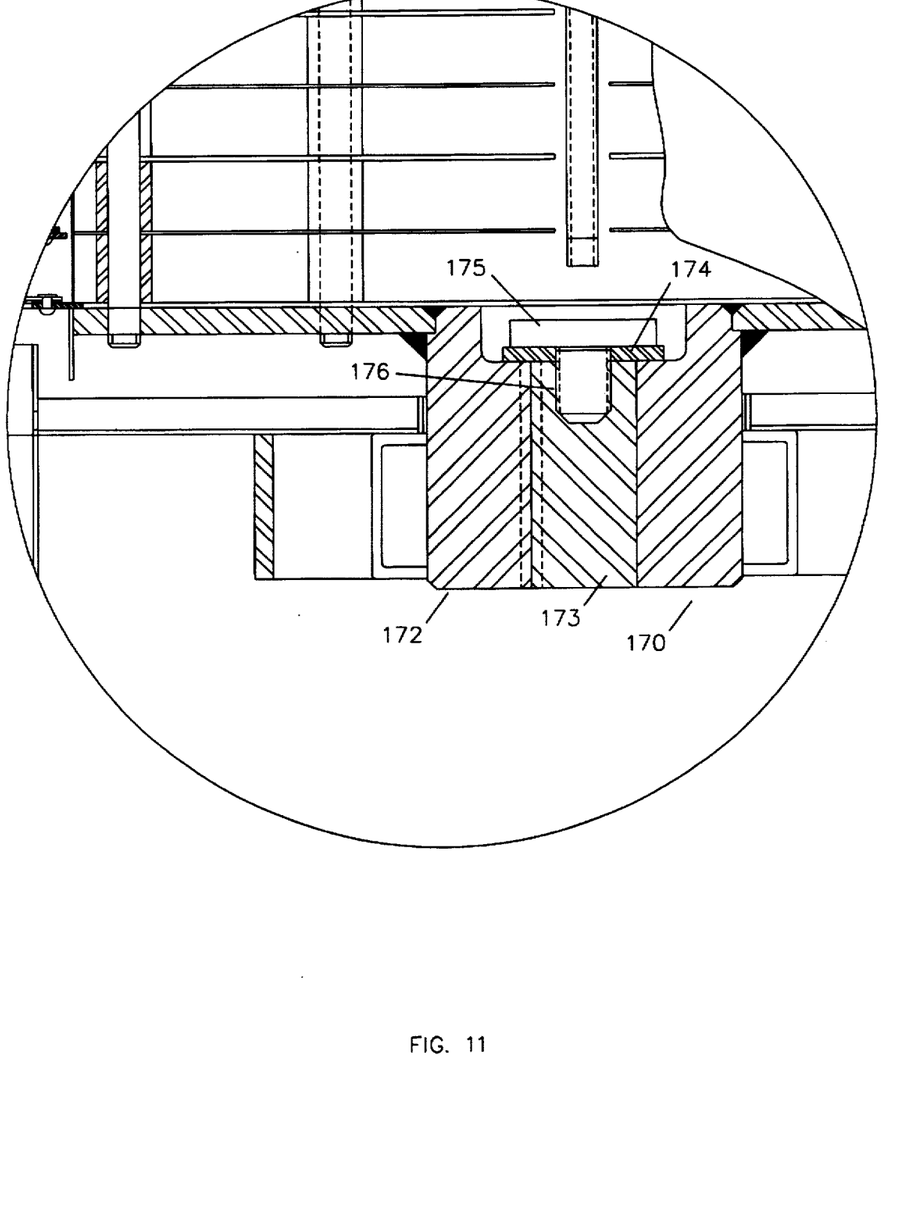
FIG. 11 is an enlarged sectional view of the lower motor water shield of the FIG. 10 apparatus.
Figure 12:
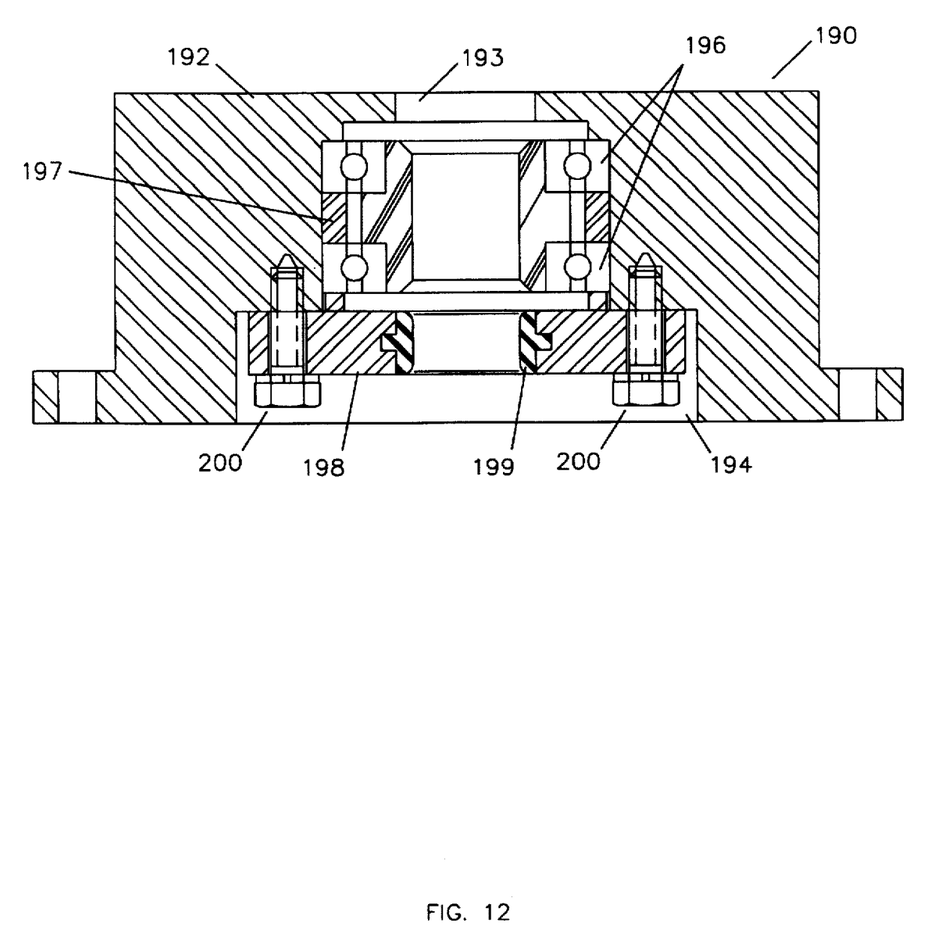
FIG. 12 is an enlarged vertical sectional view of the water delivery line guide bearing assembly of the FIG. 10 apparatus.

Subassembly 170 of this invention shown in detail in FIG. 11 and in place on the FIG. 10 general view of the apparatus serves to protect motor against effluent dripping. Plug 172 sealed fluid-tightly in hub 173 carries a cap 174 fitted in its upper end and retained a bolt 175. The upper end of hub 173 has a recess 176 of enlarged diameter in which cap 174 and bolt are received and drippage is sealed away from entry to motor 170 below.

As also illustrated in FIG. 10, water supply pipe or wand 99 is mounted and maintained in operating position by a guide bearing assembly 190. Bearing housing 192 of assembly 190 secured in place just below motor 92 has an axial opening 193 the lower end 194 of which is of enlarged diameter. Wand 99 extend through opening 193 and is carried in fixed position by an inner sleeve of hard rubber filter with bearings 196 retained in place in housing 192 by spacer 197 and housing cap 198. A seal 199 of soft rubber or other suitable plastic material carried with cap 198 prevents leakage or drainage around wand 99 below bearings 196. Cup 198 is fixed tightly in place within the lower end of axial opening 193 by bolts 200.

Figure 13:
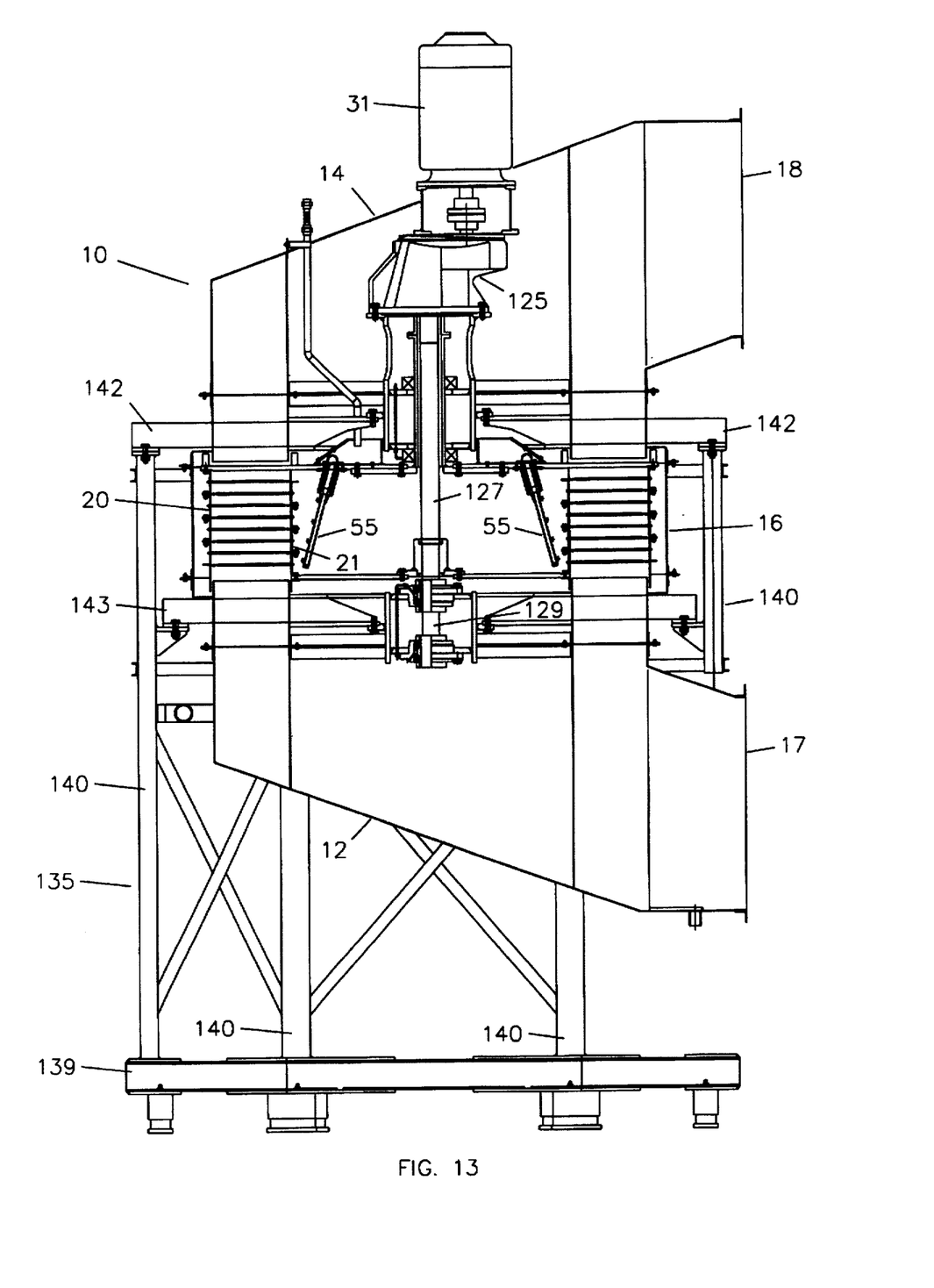
FIG. 13 is a view like that of FIG. 9 apparatus having only one motor and two coaxial drive shafts.

As indicated above, apparatus of the invention can include a single motor instead of two. As shown in FIG. 13 motor 210 drives both outer drum 20 and inner drum 21 through speed reducer 125 and coaxial shafts 127 and 129. Such as described previously in reference to FIG. 4. Again, the general apparatus in which this is used is that of FIG. 2 and so parts and components common to both bear the same reference characters.

Figure 14:
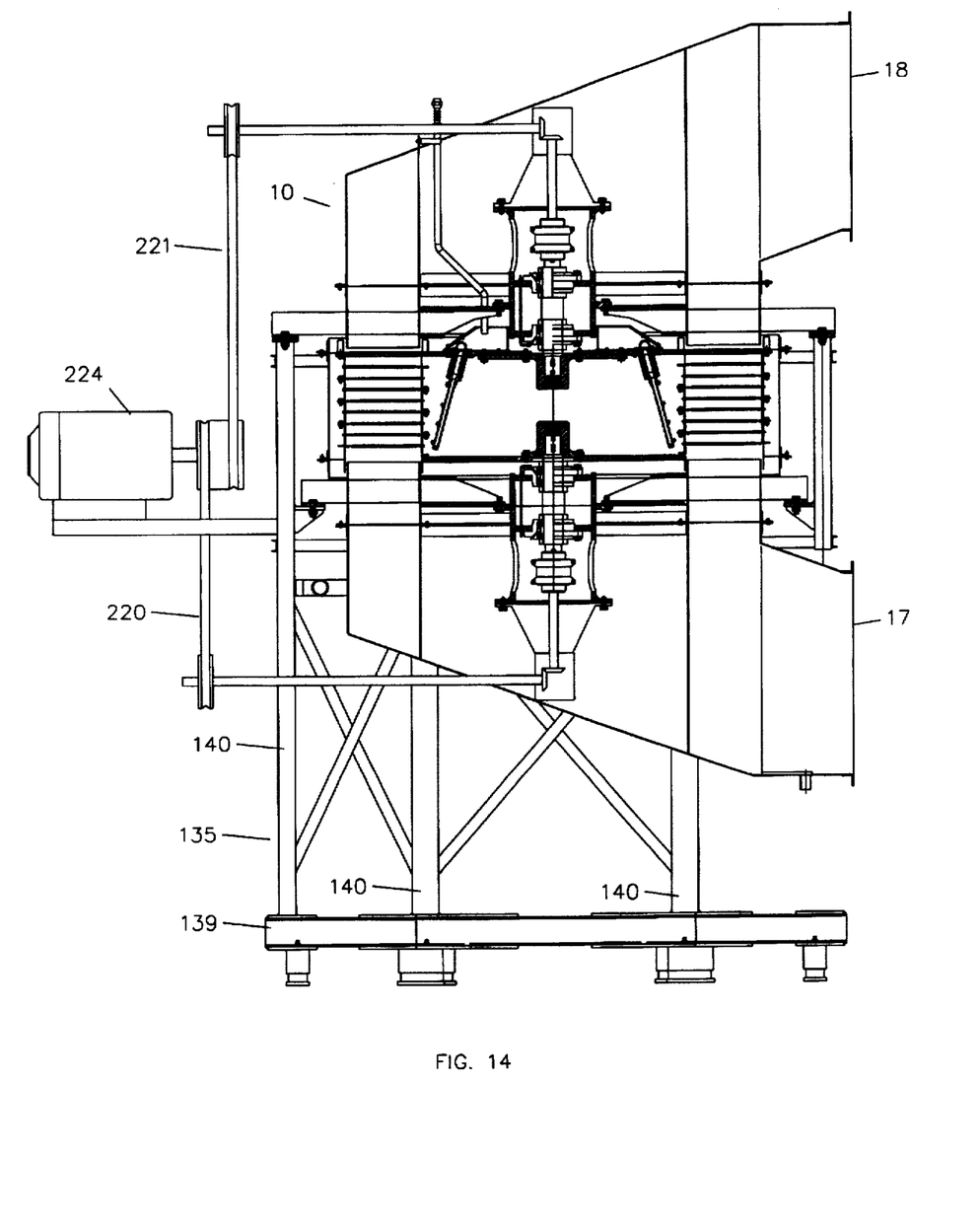
FIG. 14 is another view of FIG. 9 apparatus with one motor in off-platform position powering two belts and gear-drives.

The apparatus of FIG. 14, unlike that of FIG. 13 is powered by two belt and gear drives 220 and 221 driven by off-platform motor 224. As above common components of apparatus of FIGS. 13 and 14 are designated by the same reference characters.

Figure 15:
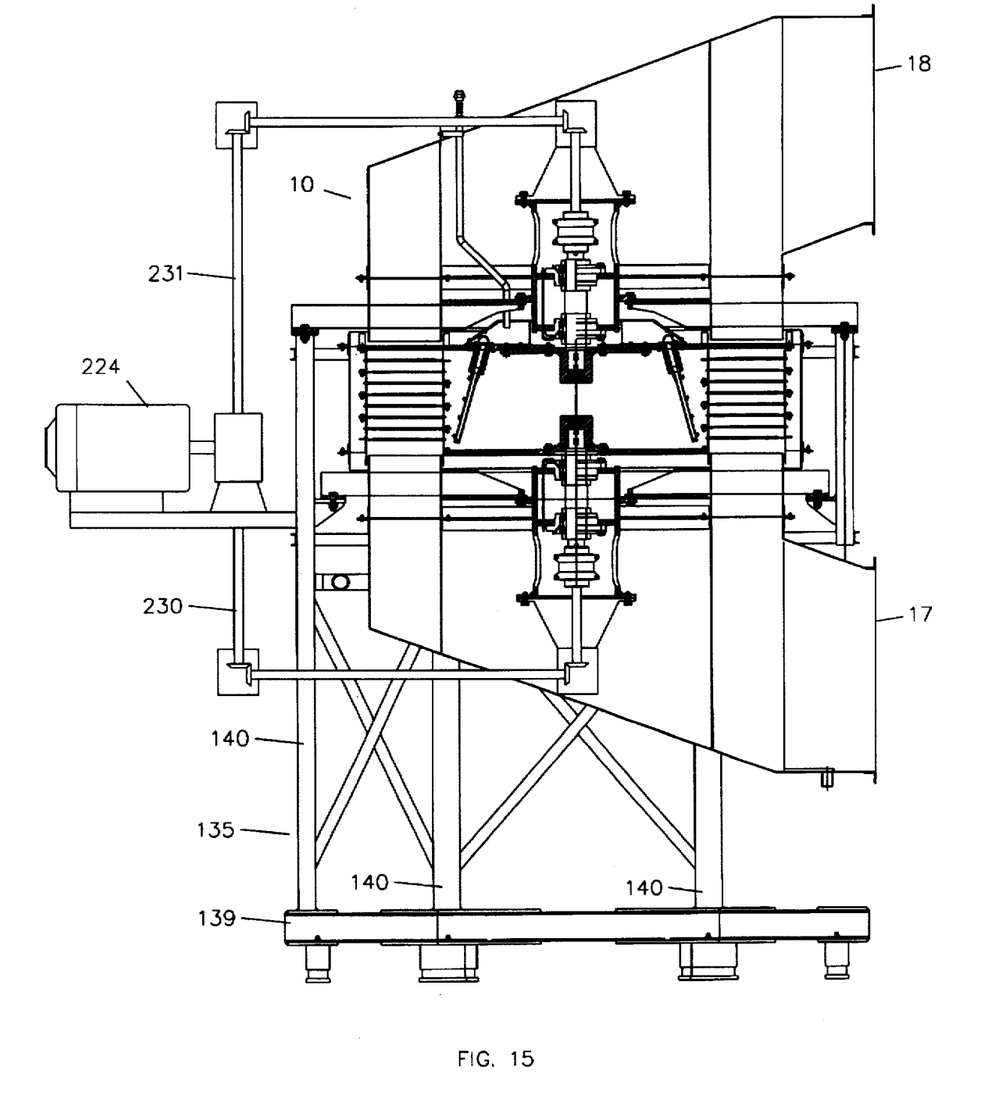
FIG. 15 is another view like that of FIG. 14 of off-platform motor powering two gear-drives; and, FIG. 16 is a view of the FIG. 2 apparatus fitted with two belt drives.

In the apparatus of FIG. 15, a single motor and two gear drives provide the power to operate at full capacity. In a general sense, this is the gear alternative to the belt drive system of the FIG. 14, drive rods 220 and 221 being replaced here by two pair of shafts 230 and 231.

Figure 16:
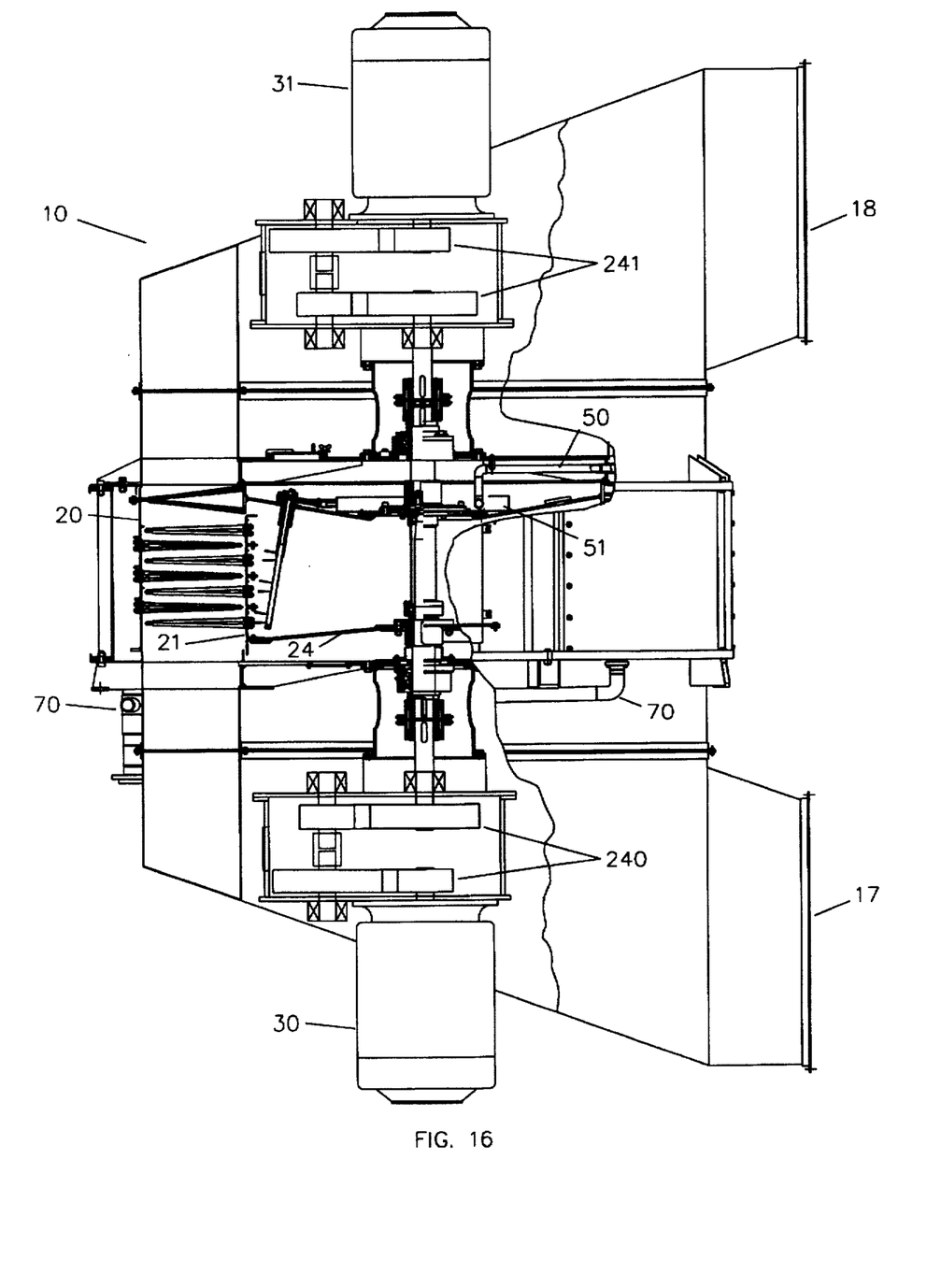

In the apparatus shown in FIG. 16, two belt drives 240 and 241 deliver motor output to drive outer and inner drums 20 and 21 in operation of the FIG. 2 apparatus as described in detail above.

Briefly described, the new method of this invention comprises the steps of providing a cylindrical open vessel to contain water, providing means for rotating the vessel thereby centrifugally forcing water in the vessel to flow to the circumferential portion of the vessel, delivering water thereby discharged from the vessel into a distributor wand having openings along its length and discharging water in sprays from the wand into contract with a stream of gas to be cleaned thereby.

I claim:

1. Gas cleaning apparatus for extracting and removing particulate material, moisture and oxides of sulfur and nitrogen from power generation combustion gasses and industrial gaseous efficient comprising a generally cylindrical housing at both ends, a separating device mounted in the housing comprising an outer drum and an inner drum of lesser diameter, the inner drum having a plurality of small openings, a water delivery wand in the inner drum having openings along its length to deliver water sprays to the small openings in the inner drum, a first set of spokes secured in pairs at their outer ends to the outer drum and extending radially with their free ends in proximity to the inner drum, a second set of spokes secured at their inner ends to the inner drum and extending radially with their free ends in proximity to the outer drum, and drive means for rotating the outer and inner drums including a first drive wheel connected to the outer drum for driving the outer drum in a first direction, and a second drive wheel connected to the inner drum to rotate the inner drum in direction counter to said first direction.

2. Apparatus of claim 1 in which the outer drum is supported by the first drive wheel and the inner drum is supported by the second drive wheel, and a first motor and second motor are operatively connected to the first and second drive wheels, respectively.

3. Apparatus of claim 2 in which a single motor is operatively connected separately to the first and second drive wheels to drive the rotation in opposite directions.

4. Apparatus of claim 1 in which the free ends of each spoke set are secured together at an included angle about 2.8 degrees.

5. Apparatus of claim 1 in which each spoke of a set presents a loading edge sloping between about 18 degrees and 36 degrees.

6. Apparatus of claim 1 including an intake plenum opening into the lower end of the gas cleaning passageway, and an exhaust plenum to receive gas from the gas cleaning passageway.

7. Apparatus of claim 4 including a motor enclosure in the intake plenum and another motor enclosure in the exhaust plenum.

8. Gas cleaning apparatus for extracting and removing particulate material, moisture and oxides of sulfur and nitrogen from power generation combustion gasses and industrial gaseous efficient comprising a generally cylindrical housing open at both ends, a separating device mounted in the housing comprising an outer drum and an inner cylindrical shield of lesser diameter having a plurality of small openings, a wand in the inner shield having openings along its length to deliver liquid sprays at the small openings in the inner shield, a first set of spokes secured in pairs at their outer ends to the outer drum and extending radially with their free ends in proximity of the inner cylindrical shield, a plurality of axially-spaced rotatably-mounted wheels, a second set of spokes secured in pairs at their inner ends to the said shield and extending radially with their free ends in proximity to the outer drum, and drive means for rotating the outer drum including a first drive wheel for driving the outer drum in a first direction, and a drive shaft to rotate the axially-spaced in direction counter to said first direction.

9. The apparatus of claim 8, including a first motor operatively connected to the drive wheel and a second motor operatively connected to the drive shaft, and additionally including a non-rotating water delivery pipe closed at its lower end extending coaxially through the drive shaft and having openings at intervals along its length to discharge water onto the rotatably mounted wheels.

* * * * *